April 15, 1969     H. GREINER     3,438,848
MOLDED GRAPHITE BODIES AND PROCESS FOR MAKING THE SAME
Original Filed Oct. 1, 1957
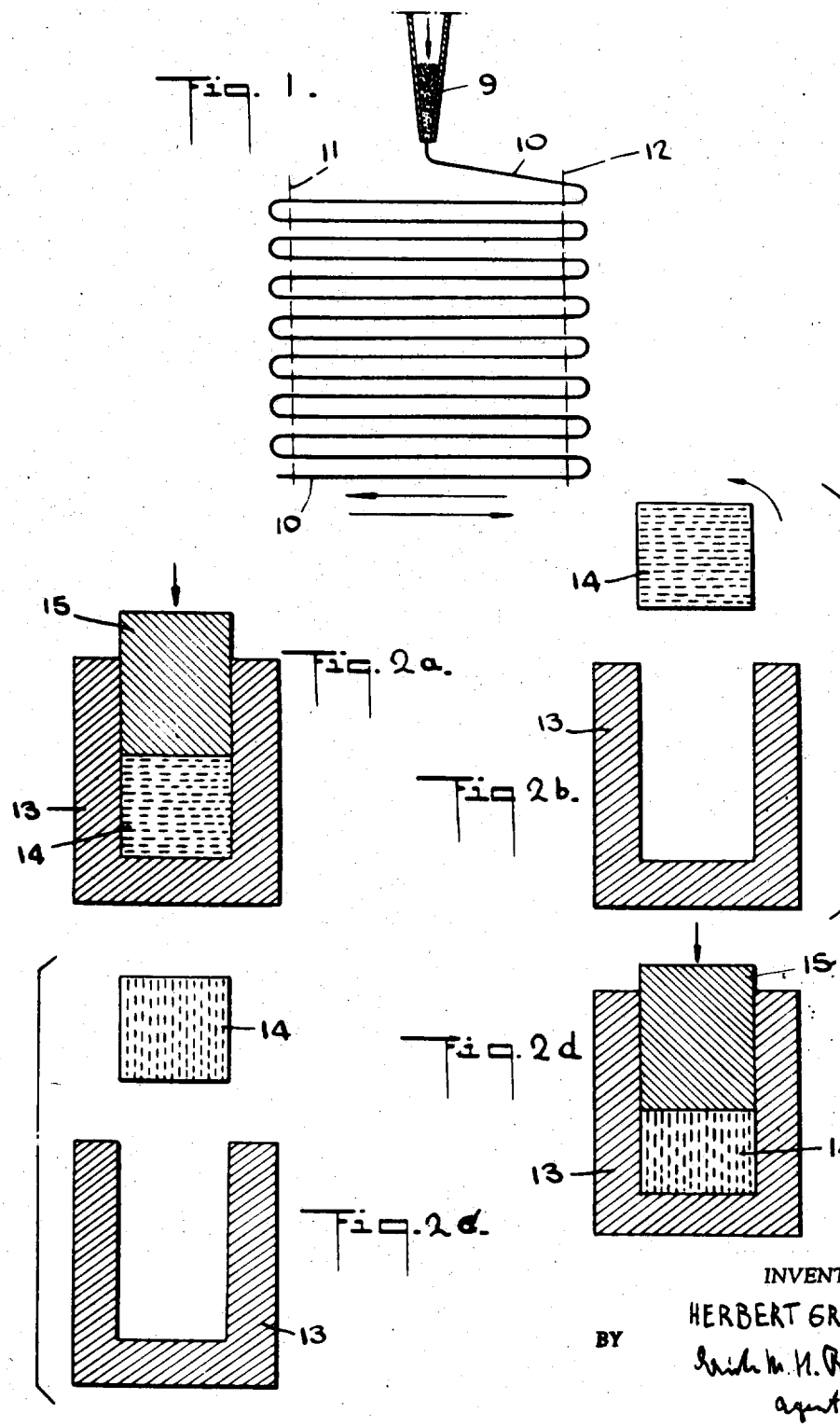
INVENTOR.
HERBERT GREINER

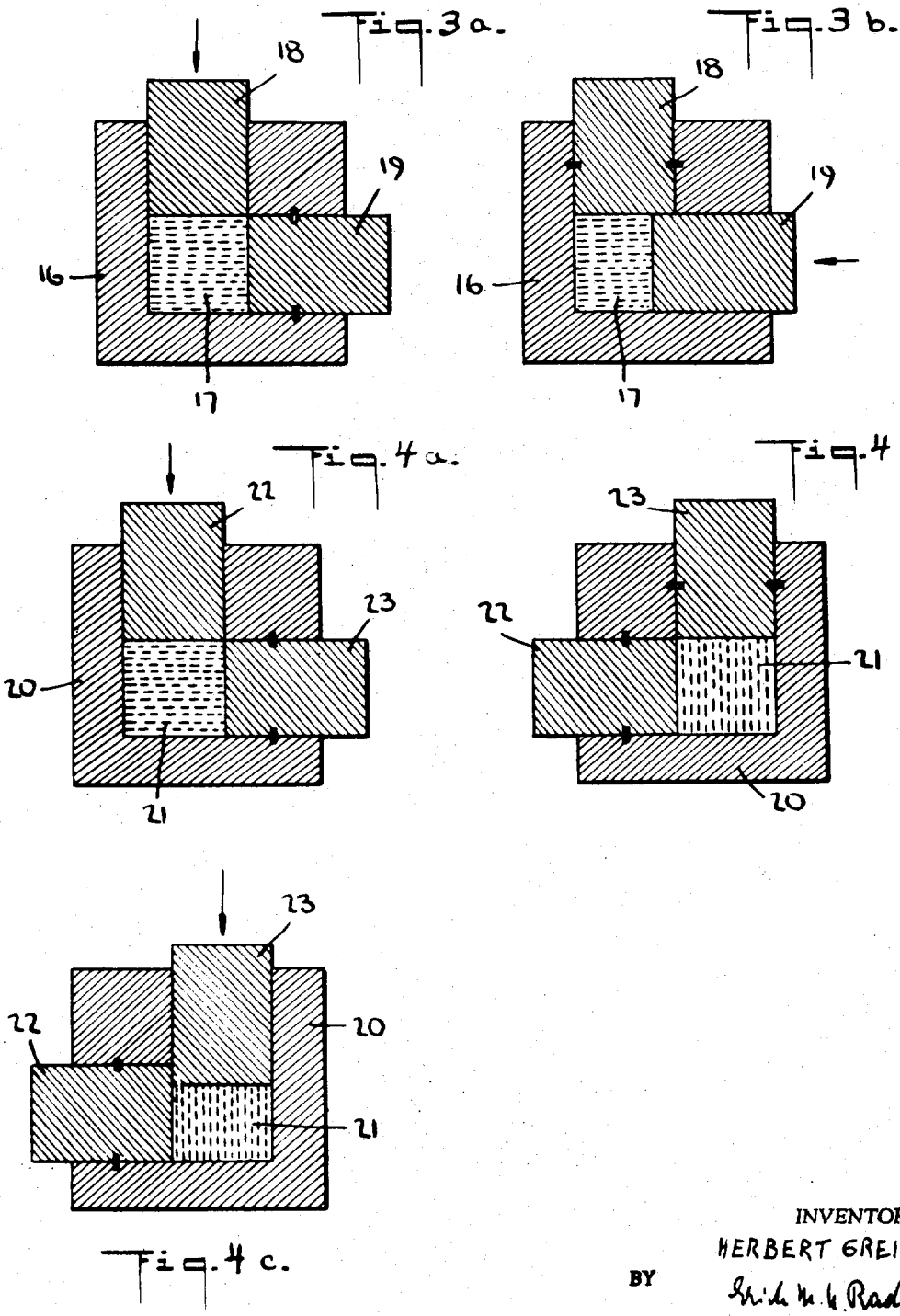

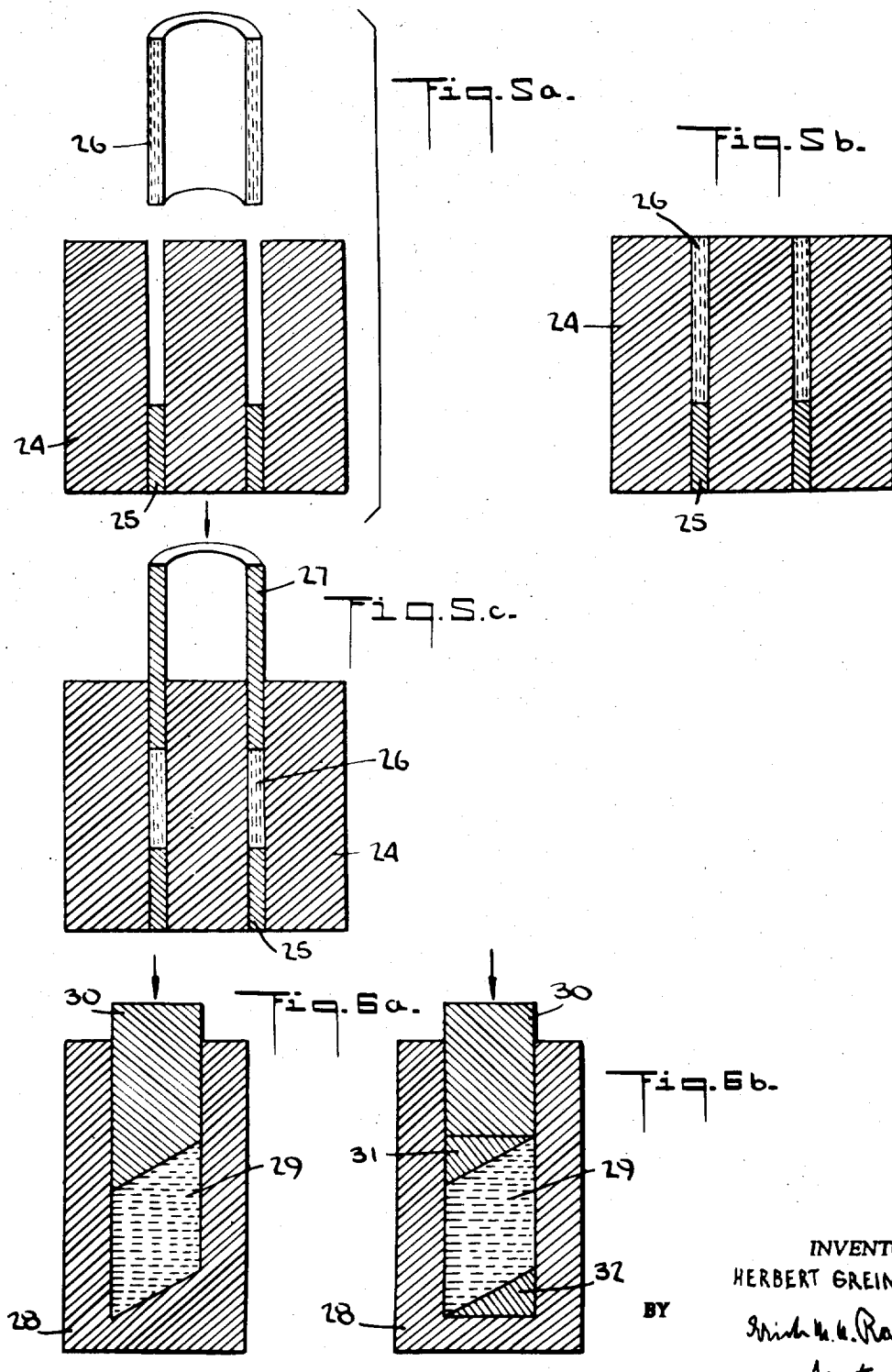

United States Patent Office 3,438,848
Patented Apr. 15, 1969

3,438,848
MOLDED GRAPHITE BODIES AND PROCESS FOR MAKING THE SAME
Herbert Greiner, 6 Passauerstrasse, 8 Munich 25, Germany
Continuation of abandoned application Ser. No. 687,518, Oct. 1, 1957. This application Feb. 9, 1965, Ser. No. 431,392
Int. Cl. B32b *19/00;* B29j *1/00*
U.S. Cl. 161—168                               6 Claims The present application is a continuation-in-part of copending application Serial No. 687,518, filed October 1, 1957, now abandoned, and entitled "Composition of Matter for Slowing Down and Reflecting Neutrons, and Process of Making Same."

The present invention relates to moderator and reflector masses and molded bodies of crystalline flaky graphite useful in nuclear reactors and other apparatus employed for technical or physical utilization of atomic energy, and to a process of making such moderator and reflector masses and molded bodies.

In nuclear reactors and other apparatus employed in the technical utilization of atomic energy, elementary carbon is used, among other substances, for slowing down and reflecting neutrons. Such elementary carbon has proved to be especially suitable for said purpose due to its low neutron absorbing capacity. Heretofore, such carbon was mainly available in the form of synthetically produced graphite of a high degree of purity. Such graphite, however, has only a comparatively low density of about 1.7 g./cu. cm. due to its almost amorphous, i.e. extremely microcrystalline structure and to its marked porosity. It is, however, very desirable that the carbon mass or, respectively, the molded body made therefrom, have as high a density as possible because thereby, among an improvement in other properties, the capacity of slowing down and reflecting neutrons is considerably increased. As a result thereof, considerable savings in active material, for instance, in uranium as well as in auxiliary materials, for instance, in moderator graphite and, due thereto, a considerable decrease in size and weight of the nuclear reactor can be achieved.

It may be mentioned that graphite bodies of finely ground and compressed graphite flakes, without binding agent, are known. They are produced by subjecting a finely divided powder of flake graphite of high purity in a suitable mold to a pressure of about 3000 kg./sq. cm. Thereby, molded bodies with a bulk density of up to 2.15 g./cu. cm. in which the graphite flakes are arranged parallel to each other at a degree of orientation of about 80% to 90% and vertical to the direction of the pressure exerted.

Attempts to carry out this process with a relatively coarse powder of flake graphite, the particle size of which is between 0.1 mm. and 0.6 mm. or even more, were unsuccessful. The resulting molded bodies contained many fine cracks and fissures and thus were not suitable for technical purposes even if the degree of orientation is 90% and more.

It is one object of the present invention to produce moderator and reflector masses and molded bodies of crystalline flaky graphite of a high degree of purity, said masses and molded bodies having a high density and being free of cracks and fissures, thus rendering the same especially suitable for use in nuclear reactors and the like apparatus.

Another object of the present invention is to provide a simple and effective process of producing substantially crack-, fissure-, and pore-free molded bodies and the like articles of high density from flaky graphite of a high degree of purity.

A further object of the present invention is to use such masses and molded bodies of flaky graphite of a high density as moderator and/or reflector material in nuclear reactors and the like apparatus for technically utilizing atomic energy.

Other objects of the present invention and advantageous features thereof will become apparent as the description proceeds.

In principle the process of producing compact, stable, crack-, fissure- and pore-free molded graphite bodies according to the present invention consists in subjecting the graphite flakes, whether small or large, to a pressure treatment under conditions whereby the flakes with their flat surfaces slide, at least to a certain extent against each other. Such a sliding movement of the graphite flakes against each other has the effect that due to the lubricating effect of the graphite the flakes are intimately and firmly attached to each other.

For instance, when filling a relatively coarse powder of flat graphite flakes into a mold, the flakes are arranged substantially parallel to each other. When subjecting the flakes to a pressure vertically to the graphite layers, the flakes are compressed in the mold downwardly without being able to carry out any lateral sliding movement. The result thereof is an insufficient binding of the flakes and the occurrence of fissures and cracks in the finished molded body.

According to an especially valuable embodiment of the present invention sliding of the graphite flakes against each other is achieved by first subjecting the graphite flakes arranged parallel to each other in the mold to a pressure acting in vertical direction to the planes of the flakes and then subjecting the resulting molded body which contains cracks and fissures to a second pressure treatment whereby the pressure acts in the direction of the parallel oriented graphite flakes. This second pressure treatment has the effect that the graphite flakes slide and thus are wedged into each other and finally are welded together. All the cracks and fissures present in the initially formed molded bodies are thus eliminated.

The molded bodies obtained by such a two-step process have a degree of orientation of the flakes of almost 100%. The molded bodies are similar to a large mosaic-like monocrystal.

The additional pressing step can advantageously also be used for graphite bodies compressed in the heretofore known manner from a powder of fine graphite flakes. Although such bodies are substantially free of cracks and fissures, the second pressure treatment in the direction of the parallel oriented graphite flakes causes telescoping and wedging of the flakes into each other followed by welding the wedged flakes and, as a result thereof, considerably increases the mechanical strength properties of the molded body and its bulk density.

Preferably crystalline flaky graphite of a high degree of purity, for instance, of a purity from about 99.9% to nearly 100% is used as starting material. The individual crystals of such very pure flaky graphite, i.e. of graphite of the highest carbon content, have densities up to a density of 2.25 g./cu. cm. In contrast to the synthetically produced microcrystalline graphite which can be obtained as a solid molded body during its production, the macrocrystalline flaky graphite according to the present invention is obtained on processing in loose form, for instance, as a coarse or fine powder consisting of flat lamellar single crystals or of fragments of such crystals, i.e. graphite flakes. The macrocrystalline flaky graphite is a naturally occurring product, which is found, for instance, in Ceylon, Madgascar, Germany, Norway, Canada, U.S.A., U.S.S.R., and other countries. As an exception such graphite is also produced technically, for instance, by decomposition of carbides. A review describing in detail properties, the methods of preparation, and the uses of the various types of graphite is given in the publication by A. Humann, "Der Graphit," Verlag Technik, Berlin, 1953.

For nuclear designs the commercial flaky graphite, usually of a carbon content of only about 90% to 95%, must be purified up to nearly 100%, for instance, by heating the flakes to 800° C.–1000° C. in the presence of chlorine gas (German Patent No. 924,690) or sodium carbonate and removing the impurities which are converted thereby into gaseous or water soluble or acid soluble compounds. Synthetically produced graphite flakes must also undergo a similar purification process.

The term "flakes" indicates only the shape of the individual discrete graphite particles but not their absolute size. The term "flaky graphite" or "graphite flakes" as used herein and in the claims annexed hereto, thus, comprises not only coarse graphite but also fine graphite provided the particles have a flaky shape.

According to the present invention, the masses and molded bodies serving for slowing down and reflecting neutrons in nuclear reactors and other apparatus for technically utilizing atomic energy consist of such high-grade and very dense crystalline flaky graphite.

When producing such masses or molded bodies from pulverulent flaky graphite, especially advantageous results are achieved, due to the plate-like shape of the crystalline graphite particles, with respect to their use in nuclear reactors and the like apparatus. Sufficiently large graphite flakes, for instance, flakes of about 0.01 mm. length and more can readily be arranged in parallel orientation to each other in the molded bodies. The compact molded bodies produced in this manner are then very similar to large graphite monocrystals of nearly maximum graphite density. However, since such bodies consist of a large number of individual single crystals linked together and telescoped into each other by proceeding as will be described hereinafter, these bodies do not exhibit the well-known mechanical disadvantages of true monocrystals such as low strength and extreme vulnerability which disadvantages render them unsuitable for rough technical use.

The objects and characteristic features of the present invention will become apparent from the consideration of the following description and drawings. In said drawings FIG. 1 illustrates a device for producing a graphite body consisting of graphite flakes in almost perfect parallel arrangement by extruding flaky graphite into a broad band and folding it in parallel layers as described hereinafter.

FIGS. 2 to 6 illustrate various devices for wedging and welding parallel arranged graphite flakes by applying a pressure acting in the direction of the layer planes or obliquely to them as described hereinafter in the example.

The production of moderator masses and molded bodies according to the present invention from pulverulent flaky graphite of a high degree of purity may be carried out by different methods.

It is readily possible to arrange in parallel orientation graphite flakes of sufficient size about 0.01 mm. Such parallel orientation is achieved almost automatically by allowing the flaky graphite powder to trickle in small partial amounts in a snow-fall like manner into the mold and gently vibrating the mold. When subsequently compressing the graphite powder in the mold, final orientation is achieved.

Sufficiently large graphite flakes (see above) can also be arranged in parallel orientation by extruding or rolling flaky graphite so as to form a thin platelet. For instance, according to FIG. 1 a paste containing flaky graphite powder and a volatile liquid substance such as alcohol or ether and the like, mixed in a ratio of about 1.5:1 to 1:1, is extruded in an extrusion press 9 into a broad band 10 which then comprises the flakes in excellent orientation. After leaving the extrusion press, the flexible band 10 is many times folded and put down in layers one upon another as shown in said FIG. 1. Thereafter, the edges of the folded band are cut off as indicated by the dotted lines 11 and 12. The remaining loose body arranged in horizontal layers, is inserted into a mold, heated to evaporate and drive out the volatile material, and finally compressed to a solid body. Prepared in this manner the graphite flakes are arranged in almost perfect orientation. Rolling dry graphite flakes in a rolling press and subsequently treating the obtained thin platelets in a similar manner as described above gives also excellent results.

As stated above, an especially advantageous embodiment of the present invention consists in exposing the molded bodies to additional lateral pressure whereby the flakes of graphite are wedged, i.e. telescoped into each other. It is the preferred procedure, first to exert a vertical pressure upon the preformed body and subsequently a lateral pressure. In this manner parallel orientation of the flakes is not substantially affected and disturbed.

This method, as mentioned hereinbefore eliminates the remaining pores and certain other defects of the molded bodies which are encountered when merely applying a vertical pressure on the graphite flakes arranged in parallel orientation. Such vertically compressed bodies exhibit usually fine hairline cracks and capillary fissures which run parallel to the direction of the flakes and which readily cause cleavage brittleness when the molded bodies are exposed to mechanical stress. However, when exposing to lateral pressure the stratified bodies subsequently to the action of the vertical pressure thereon, all hairline cracks and capillary fissures which are present in the molded body are completely sealed and eliminated due to the interlacing and telescoping of the parallel arranged graphite flakes into each other. As a result of such a lateral pressure treatment, no predetermined places where breaking may occur are present in the molded body. Thus, the density as well as the mechanical strength of the initial molded bodies are increased considerably by this expedient.

Optimum effects are furthermore achieved by not only wedging into each other the parallel oriented graphite flakes by the action of the additionally applied lateral pressure but also by welding said flakes with each other according to another embodiment of the present invention. This result is achieved by displacing the lattice layers of the crystalline graphite flakes with respect to each other by means of an appropriate pressure acting in the direction of the layer planes or obliquely to them. As is well known the peculiar lubricity and smearing capacity of flaky graphite is due to this behavior.

EXAMPLE

The following process permits the production of flowless graphite bodies of sufficient size and of high density and mechanical strength. It is carried out by various technical methods. These methods require, of course, the use of graphite flakes which are oriented parallel to each other.

*Method A*

FIGS. 2a to 2d show the various steps of carrying out this method. In these figures, mold 13 receives body 14 and pressure is exerted by die 15. A powder of sufficiently large graphite flakes (see above) and of a high degree of purity is placed into the mold 13 of square cross-section so that the flakes are arranged in horizontally parallel orientation. The mass is then pressed to a cubic molded body of a density of about 1.8–2.2 g./cu. cm. by applying thereto a vertical pressure of about 1000–3000 kg. sq. cm. as shown in FIG. 2a. This preliminary step is necessary in order to provisionally attach the flakes to each other and to prevent them from changing their position during the subsequent steps. The premolded body which has a density of about 1.8 to 2.15 is then removed from the mold as shown in FIG. 2b and is turned and reinserted thereinto in an exactly fitting manner as shown in FIG. 2c so that the graphite flakes which are oriented parallel to each other are now in upright position. Thereupon, the premolded body is compressed by vertically applying an appropriate pressure as shown in FIG. 2d. For telescoping into each other and for wedging together the flakes so as to eliminate the hairline cracks and capillary fissures and to increase the strength of the body, a pressure of about 3000–5000 kg./sq. cm. is sufficient. The resulting molded body has a density of up to 2.2. However, for welding the flakes together and, thereby, simultaneously displacing numerous lattice planes, a higher pressure in the range of 5000–8000 kg./sq. cm. and more is required. Under such a high pressure a graphite body of maximum strength and freedom of pores and of a density of about 2.23 (small flakes) to nearly 2.25 (large flakes) is obtained.

This method of an "aimed" compression can be varied. Thus, it is possible, for instance, to use a mold of square or rectangular cross-section which permits the application of a horizontal pressure to the preformed graphite body by means of the mold illustrated in FIGS. 3a and 3b. Mold 16 is open at the top to allow vertically acting die 18 to act on body 17. Mold 16 has also a lateral opening for die 19 which is capable of exerting a lateral pressure on body 17. When using such a mold it is not necessary to remove from the mold the premolded blank obtained by application of vertical pressure, but it can immediately be subjected to the final pressure by means of a force acting upon the horizontally guided press die.

One may also provide a third press die which also acts in horizontal direction upon the molded body 17 but at a right angle to second die 19. Finally it is also possible to apply four, five, or six press dies, one for each of the six faces of the molded body. These dies are operated successively either one after the other or, preferably, in couples of two press dies opposite each other and simultaneously counteracting each other in axial direction.

The entire equipment can also be simplified considerably. Thus, it is not necessary to use as many pressure producing devices as press dies are provided. For instance, the pressure producing device acting in horizontal direction on press die 23 can be omitted by turning mold 20 and premolded body 21 as shown in FIGS. 4a and 4b, after vertical pressure has been exerted on the mold according to FIG. 4a in such a manner that the second press die 23 is now in upright position. After locking press die 22, final pressing can be performed, as shown in FIG. 4c, by means of the same pressure producing device which was used before. Similar simplification is possible with respect to molds provided with three or more press dies.

Method B

The principle of the present invention as explained hereinabove can also be applied to the production of molded bodies of a more complicated shape, such as tubes and the like. The tube is first extruded starting from a paste which consists of graphite flakes and a volatile liquid such as ethanol or ether mixed in a ratio of about 3:2. By extruding the paste, the flakes are concentrically parallel arranged in the longitudinal direction of the resulting tube 26. Thereafter, the tube is directly transferred into a suitable molding matrix, such as the matrix 24 of FIGS. 5a to 5c with counter-die 25. It is heated and the liquid is evaporated. Finally tube 26 in matrix 24 with die 25 is subjected to a pressure of about 5000–8000 kg./sq. cm. by means of corresponding pressing patrix 27 of tube-like shape. Since the pressure acts in the direction of the layer planes, welding together and telescoping of the graphite flakes into each other occur as described hereinabove. The tubes and the like article made in this manner are extremely dense (of a density of up to 2.25 g./cu. cm.) and almost impermeable to liquid and gaseous materials.

Method C

As shown in FIG. 6a, graphite flakes 29 of a high degree of purity which are arranged in horizontally parallel orientation in mold 28 are exposed to an obliquely acting pressure. For this purpose, the bottom of the mold 28 is sloped at an angle of inclination of about 30–45° and the face of press die 30 operating vertically is also sloped in the corresponding direction. Or corresponding wedges 31 and 32 are placed in the mold as shown in FIG. 6b. When pressing graphite flakes in this manner, wedging takes place under a pressure of about 3000–5000 kg./sq. cm. whereby the flakes are caused to slide to a certain extent upon each other. Welding of the wedged flakes occurs when increasing the pressure to 5000 kg./sq. cm. and higher. The resulting molded graphite body is free of cracks and fissures and has a bulk density of about 2.2.

It is also possible to use molds which are open at the top and at the bottom and to provide the wedges 37 and 32 and two press dies opposite each other and vertically counteracting each other in axial direction. Apart from other advantages such an arrangement will facilitate removing of the molded graphite bodies from the mold. Likewise, in the mold illustrated in FIGS. 6a and 6b two vertically counteracting dies with sloping faces may be used.

The molded graphite bodies obtained according to the present invention possess strength properties and a density which considerably surpasses those of molded graphite bodies as produced heretofore. In fact, the process according to the present invention permits, for the first time, to produce large molded bodies from large graphite flakes at a technically feasible pressure. When attempting to produce such large graphite bodies by subjecting the graphite flakes to the conventional one-sided pressure, it is necessary to expose the graphite bodies to a pressure of about 20,000 kg./sq. cm., i.e. to a pressure at which the graphite becomes plastic. To operate under such high pressure, however, is very difficult and highly uneconomic.

The high density and the absence of pores, cracks, and fissures in the molded graphite bodies according to the present invention renders them especially suitable as moderator and reflector material for nuclear reactors. Heretofore, the molded bodies of artificial graphite as used in such nuclear reactors had a bulk density of 1.7. This density could be increased by repeated impregnation followed by a coking treatment to about 1.9. The molded bodies made from fine graphite flakes had a maximum density of 2.15. In contrast thereto molded graphite bodies from fine graphite flakes can be produced with a density of 2.23 and the subtantially pore-free molded bodies produced from large graphite flakes attain almost the density maximum of 2.25 as possessed by highly purified crystalline graphite.

Molded graphite moderator and reflector bodies obtained as described hereinabove can be converted into the shape, size, and form required for subsequent use, for instance, into plates, bricks, cubes, cylinders, tubes, and the like either during their preparation or on subsequent processing.

For instance, the reflector casing or jacket and the moderator mass as well as thermal columns and other auxiliary arrangements may be constructed of such molded and shaped bodies by assembling such prefabricated graphite blocks and the like shaped blanks according to the present invention. Moderator and reflector masses and molded bodies which have an almost pore-free structure, are especially suitable for reactors which are operated with liquid media, for instance, with water or molten metals used as coolants or as solvents for the fuel material, or the like. Such bodies do not allow any undesired penetration of the liquid into the graphite mass.

A high density of the moderator and reflector material is of importance not only because it assures, among others, satisfactory neutron economy, but also because it permits a considerable saving in reactor material, for instance, in uranium.

Of course, many changes and variations in the manner in which the graphite flakes are arranged in parallel orientation and are compressed to compact molded bodies, in which the parallel oriented graphite flakes are wedged or welded together, in which the moderator and/or the reflector bodies are assembled to reactors or the like apparatus, and the like may be made by those skilled in the art in accordance with the principles set forth herein and in the claims annexed hereto.

To summarize, the characteristic feature of the most important embodiment of the present invention is to apply pressure to macrocrystalline graphite flakes arranged in parallel layers in a direction perpendicular to said layers and then to subject the resulting premolded graphite body of parallel oriented layers of graphite flakes to a pressure treatment in the direction of the flake layers whereby sliding and wedging or welding of the graphite flakes is achieved. As a result thereof any cracks and fissures in the preformed body of parallel oriented layers of flaky graphite are eliminated. It is quite surprising that exposing a premolded body to a lateral pressure in the direction of the graphite layers eliminates such cracks and fissures while it could be expected that a pressure vertically exerted upon the graphite layers would produce this result. Relatively moderate vertically exerted pressure of about the same magnitude, however, is unable to achieve this effect.

I claim:

1. In a process of producing compact and mechanically resistant, binder-free molded graphite bodies of a bulk density of about 2.1–2.2 g./cu. cm. consisting of graphite flakes in parallel orientation, the steps comprising arranging macrocrystalline graphite flakes of high purity in parallel layers, applying pressure to the parallel flake layers in an enclosed space in a direction perpendicular to the layers to form a premolded body, and then subjecting the premolded body in an enclosed space substantially exactly fitting the premolded body to a pressure of about 3000–5000 kg./sq. cm., said pressure acting in the direction of the parallel flake layers so as to cause wedging into each other of the graphite flakes and eliminating fissures and other imperfections of the premolded body.

2. In a process of producing compact, binder-free and substantially pore and fissure-free molded graphite bodies of a bulk density of about 2.25 g./cu. cm. consisting of graphite flakes in parallel orientation, the steps comprising arranging macrocrystalline graphite flakes of high purity in parallel layers, applying pressure to the parallel flake layers in an enclosed space in a direction perpendicular to the layers to form a premolded body, and then subjecting the premolded body in an enclosed space substantially exactly fitting the premolded body to a pressure exceeding 5000 kg./sq. cm., said pressure acting in the direction of the parallel flake layers so as to cause welding together of the graphite flakes in a smearing manner and eliminating fissures and other imperfections of the premolded body.

3. In a process of producing compact and mechanically resistant, binder-free molded graphite bodies of a bulk density of about 2.2 g./cu. cm. consisting of graphite flakes in parallel orientation, the steps comprising arranging macrocrystalline graphite flakes of high purity in parallel layers into a mold having a bottom sloped at an angle of inclination of about 30–45°, subjecting the graphite flake layers to a pressure exceeding 5000 kg./sq. cm. by a vertically operating press die provided with a wedge sloped at the same angle of inclination as that of the bottom of the mold, thereby exerting an obliquely acting pressure upon the parallel graphite flake layers so as to cause first wedging and finally welding together of the graphite flakes and eliminating fissures and other imperfections of the molded body.

4. In a process of producing compact, binder-free and substantially pore- and fissure-free graphite tubes of a bulk density of about 2.25 g./cu. cm., the steps comprising mixing flaky graphite of high purity with a volatile liquid substance, extruding the resulting paste in an extrusion machine so as to form a tube wherein the graphite flakes are concentrically arranged in parallel layers in the longitudinal direction of the tube, inserting the moist tube into a fitting matrix, heating the tube to evaporate the liquid, and finally subjecting the resulting dry tube in said fitting matrix to a pressure exceeding 5000 kg./sq. cm., said pressure acting in the direction of the graphite flakes arranged in parallel layers in said tube, thereby welding together the graphite flakes in a smearing manner and making the walls of the tube almost impermeable to liquid and gaseous materials.

5. Large, compact, binder-free and substantially pore-, crack-, and fissure-free molded graphite body having a bulk density of at least 2.1 g./cu. cm. and consisting of parallel oriented, crystalline graphite flakes of a purity of at least about 99.9% of carbon, said graphite flakes being wedged into each other and welded together, said molded body being useful as moderator and reflector mass in a nuclear reactor.

6. Large, compact, binder-free and substantially pore-, crack-, and fissure-free molded graphite body having a bulk density of 2.25 g./cu. cm. and consisting of parallel oriented, crystalline graphite flakes of a purity of at least about 99.9% of carbon, said graphite flakes being wedged into each other and welded together, said molded body being useful as moderator and reflector mass in a nuclear reactor.

References Cited

UNITED STATES PATENTS

| 630,397 | 8/1899 | Niedringhaus | 264—294 |
| 1,556,990 | 10/1925 | Henry | 252—511 |
| 2,419,356 | 4/1947 | Korte | 252—502 |

OTHER REFERENCES

Proceedings of the International Conference on the Peaceful Uses of Atomic Energy, Aug. 8, 1955, vol. 8, pp. 453, 456, and 498.

ROBERT F. BURNETT, *Primary Examiner.*

R. L. MAY, *Assistant Examiner.*

U.S. Cl. X.R.

176—88; 264—294